United States Patent
Abe et al.

(10) Patent No.: US 9,977,193 B2
(45) Date of Patent: May 22, 2018

(54) DUST CAP AND OPTICAL TRANSCEIVER

(71) Applicant: Oclaro Japan, Inc., Sagamihara, Kanagawa (JP)

(72) Inventors: Yuki Abe, Kanagawa (JP); Shigeru Tokita, Kanagawa (JP)

(73) Assignee: OCLARO JAPAN, INC., Kanagawa (JP)

( * ) Notice: Subject to any disclaimer, the term of this patent is extended or adjusted under 35 U.S.C. 154(b) by 0 days. days.

(21) Appl. No.: 15/471,441

(22) Filed: Mar. 28, 2017

(65) Prior Publication Data

US 2017/0285273 A1    Oct. 5, 2017

(30) Foreign Application Priority Data

Apr. 5, 2016 (JP) ................................. 2016-076140

(51) Int. Cl.
*G02B 6/38* (2006.01)
*G02B 6/42* (2006.01)

(52) U.S. Cl.
CPC ........... *G02B 6/3849* (2013.01); *G02B 6/385* (2013.01); *G02B 6/4246* (2013.01); *G02B 6/4292* (2013.01)

(58) Field of Classification Search
CPC ..... G02B 6/3849; G02B 6/385; G02B 6/4246
See application file for complete search history.

(56) References Cited

U.S. PATENT DOCUMENTS

| | | | | |
|---|---|---|---|---|
| 4,736,100 A * | 4/1988 | Vastagh | ................ | G02B 6/266 250/227.11 |
| 6,398,422 B1 * | 6/2002 | Szilagyi | ............... | G02B 6/3849 385/76 |
| 6,439,776 B1 * | 8/2002 | Harrison | ............. | G02B 6/3827 385/137 |
| 6,599,033 B1 * | 7/2003 | Pohnke | ................ | G02B 6/3849 385/139 |
| 6,985,668 B2 * | 1/2006 | Mazotti | ................ | G02B 6/4246 385/146 |
| 8,224,146 B2 * | 7/2012 | Hackett | ................ | G02B 6/3825 385/134 |
| 8,783,968 B2 * | 7/2014 | Adams | ................ | G02B 6/3879 385/134 |
| 9,002,170 B2 * | 4/2015 | Neitge | ................... | G02B 6/443 385/139 |
| 9,709,755 B2 * | 7/2017 | Larkin | ................... | G02B 6/385 |
| 9,823,425 B2 * | 11/2017 | Xiao | .................... | G02B 6/3849 |

(Continued)

*Primary Examiner* — Daniel Petkovsek
(74) *Attorney, Agent, or Firm* — Mattingly & Malur, PC (57) ABSTRACT

The invention provides a dust cap which allows for performing operation test of an optical transceiver without removing the dust cap from the optical transceiver. The dust cap 100 comprises: a connector 110*a* having an opening on a distal end of the connector 110*a*, which is pressed into a transmission adapter of the optical transceiver 300; a connector 110*b* having an opening on a distal end of the connector 110*b*, which is pressed into a reception adapter of the optical transceiver 300 adjacent to the transmission adapter; a support member 140 connected with proximal ends of the connectors 110*a*, 110*b* and configured to support the connectors 110*a*, 110*b*; and an optical transmission path 130 configured to pass through the connector 110*a*, the support member 140, and the connector 110*b* in that order and to transmit light from the opening of the connector 110*a* to the opening of the connector 110*b*.

5 Claims, 7 Drawing Sheets

(56) References Cited

U.S. PATENT DOCUMENTS

2001/0028771 A1\* 10/2001 Johansson ............ G02B 6/4246
                                                            385/92
2003/0063862 A1\* 4/2003 Fillion ................. G02B 6/3825
                                                            385/53

\* cited by examiner

FIG.7

DUST CAP AND OPTICAL TRANSCEIVER

CROSS-REFERENCE TO RELATED APPLICATION

The present application claims priority from Japanese application JP 2016-076140 filed on Apr. 5, 2016, the content of which is hereby incorporated by reference into this application.

BACKGROUND OF THE INVENTION

1. Field of the Invention

The invention relates to a dust cap for an optical transceiver and an optical transceiver comprising the dust cap.

2. Description of the Related Art

An optical transceiver comprises two adjacent adapters (a port and a connector) into which optical fiber connectors for optical transmission and reception are inserted, respectively. Typically, an optical fiber made from quartz glass is used for an optical transmission path in the optical transceiver. The optical fiber has a small diameter, such as 50.0 mm or 62.5 mm for a multi-mode fiber and 9.2 mm for a single-mode fiber. Due to the small diameter, adhesion of even very fine foreign matter to fiber connectors of the optical fiber can cause poor communication. In order to prevent such poor communication, dust caps are inserted into these adapters at the time of shipment, respectively.

At the time of installation of an optical communication facility, the dust caps are removed from the adapters. Then, operation test for the optical transceiver may be carried out. Specifically, an optical fiber cable for the operation test is prepared, comprising two connectors attached to the respective ends of the cable. One connector is inserted into one adapter (hereinafter referred to as "a transmission adapter"), and the other connector is inserted into the other adapter (hereinafter referred to as "a reception adapter"). The operation test is carried out by causing the optical transceiver to transmit test signals through the transmission adapter, and then to receive the test signals through the reception adapter.

However, in the operation test of the optical transceiver, the dust caps are removed, then the optical transceiver is decided as malfunctioning when the connectors are malfunctioning or improperly inserted into the adapters. The optical transceiver is also decided as malfunctioning when dust enters the adapters while the connectors are inserted into the adapters, respectively. In this case, it is no longer possible to determine whether the optical transceiver has initial failure or dust enters the adapters while the connectors are inserted into the adapters, respectively.

Even in case of simple test such as confirmation of conduction of the optical transceiver, the dust caps must be removed in order to insert the connectors into the adapters, respectively. When the dust caps are replaced with the connectors respectively, the connectors and/or the inside of the transmission and reception adapters should be cleaned. Such cleaning of the optical transceiver can lead to increase in cost, for example, personnel expenses for the cleaning and set-up of the optical transceiver, and cost for cleaning tools.

From the above-mentioned drawbacks, it is an object of the present invention to provide a dust cap which allows for performing the operation test of the optical transceiver without removing the dust cap from the adapters.

SUMMARY OF THE INVENTION

A dust cap of the invention used for an optical transceiver comprising a transmission adapter and a reception adapter comprises: a transmission connector having an opening on a distal end of the transmission connector, which is pressed into the transmission adapter; a reception connector having an opening on a distal end of the reception connector, which is pressed into the reception adapter adjacent to the transmission adapter; a support member connected with proximal ends of the transmission and reception connectors and configured to support the transmission and reception connectors; and an optical transmission path configured to pass through the transmission connector, the support member and the reception connector in that order and to transmit light from the opening of the transmission connector to the opening of the transmission connector.

According to a dust cap of the invention, the operation test of the optical transceiver may be carried out with the dust cap attached to the transmission and reception connectors of the optical transceiver. The dust cap eliminates the replacement of the dust cap with the adapters for the operation test, and thus prevents the distal ends of the connectors from deposition of dust. As a result, the optical transceiver is not decided as malfunctioning because of dust. Furthermore, the dust cap eliminates any need to clean up the connectors or the transmission and reception adapters, resulting in decrease in cost.

BRIEF DESCRIPTION OF THE DRAWINGS

The invention will be described in detail with reference to the following drawings in which.

Like reference numerals designate the same or similar elements throughout all views so as to avoid any redundant description of the same or similar elements.

DETAILED DESCRIPTION OF THE INVENTION

Figure 1:
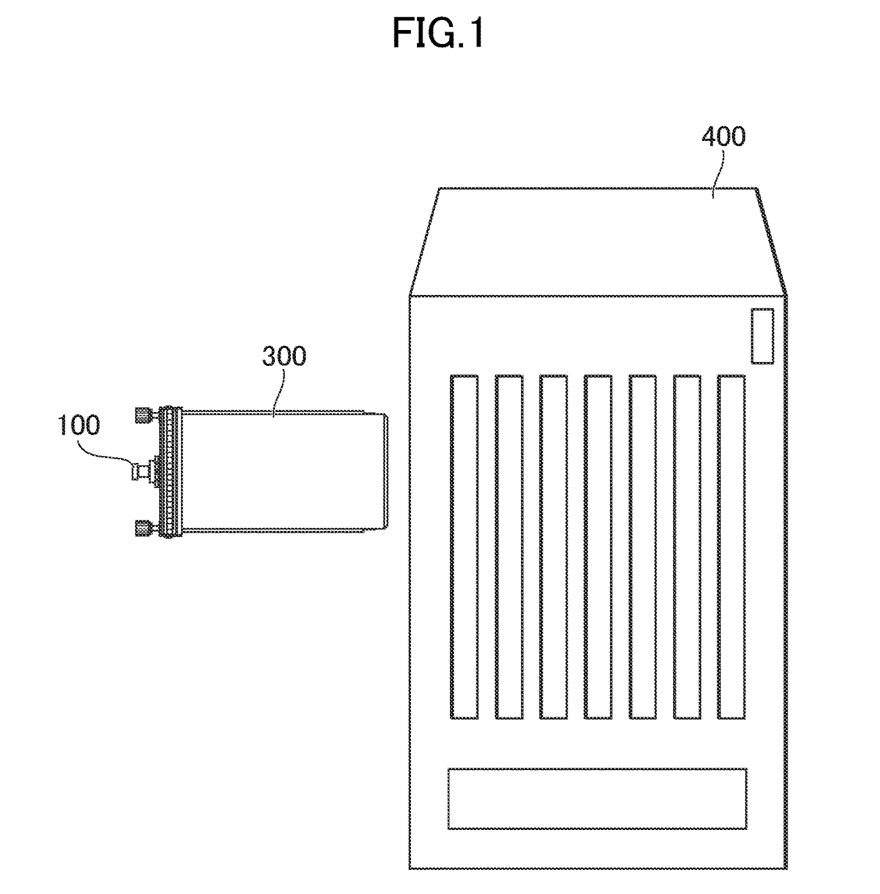
FIG. 1 schematically shows a perspective view of an optical transceiver attached with a dust cap according to an embodiment of the invention and an optical transmission device to be installed with the optical transceiver.
Figure 2:
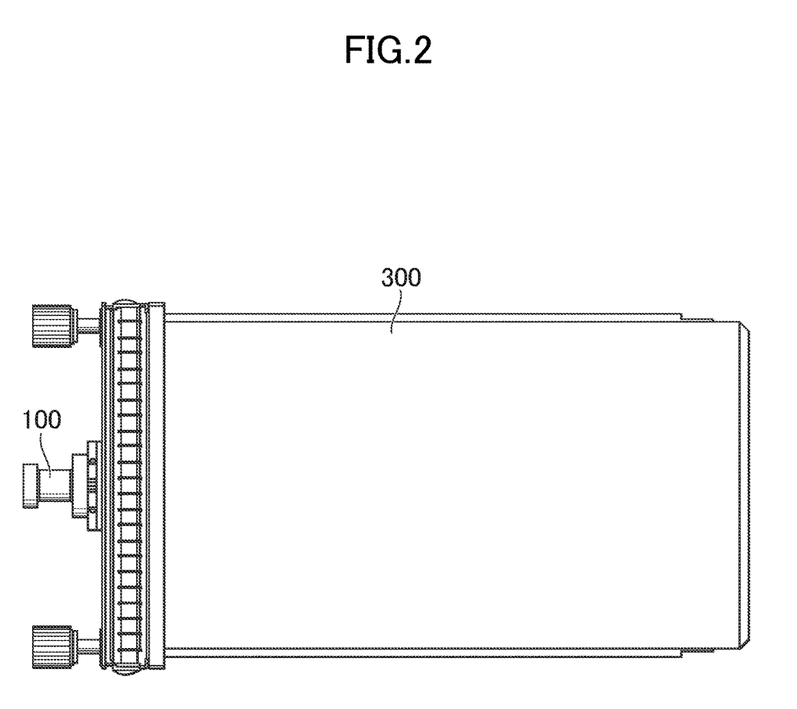
FIG. 2 shows a top view of an optical transceiver attached with a dust cap according to an embodiment of the invention.

FIG. 1 schematically shows a perspective view of an optical transceiver 300 attached with a dust cap 100 according to an embodiment of the invention and an optical transmission device 400 to be installed with the optical transceiver 300. FIG. 2 shows a top view of an optical transceiver 300 attached with a dust cap 100 according to an embodiment of the invention. As shown in FIG. 1, the optical transceiver 300 generally has a planar shape, and is installed into the optical transmission device 400, with the distal end of the optical transceiver 300 facing the optical transmission device 400. A transmission adapter providing an opening for a transmission connector of an optical fiber cable and a reception adapter providing an opening for a reception connector of the optical fiber cable are located adjacently on the proximal end of the optical transceiver 300 (not shown in Figs). At the time of shipment of the optical transceiver 300, the dust cap 100 according to an embodiment of the invention is inserted into the transmission and reception adapters of the optical transceiver 300. Although the dust cap 100 prevents dust from penetrating into the transmission and reception adapters, the dust cap 100 has an optical transmission path in the dust cap 100. Thus, operation test for the optical transceiver can be carried out while the dust cap 100 is still inserted into the transmission and reception adapters of the optical transceiver 300. When the optical transceiver 300 is actually used, the dust cap 100 is removed from the optical transceiver 300. Then, the transmission and reception connectors of the optical fiber cable are inserted into the transmission and reception adapters of the optical transceiver 100, respectively.

Figure 3:
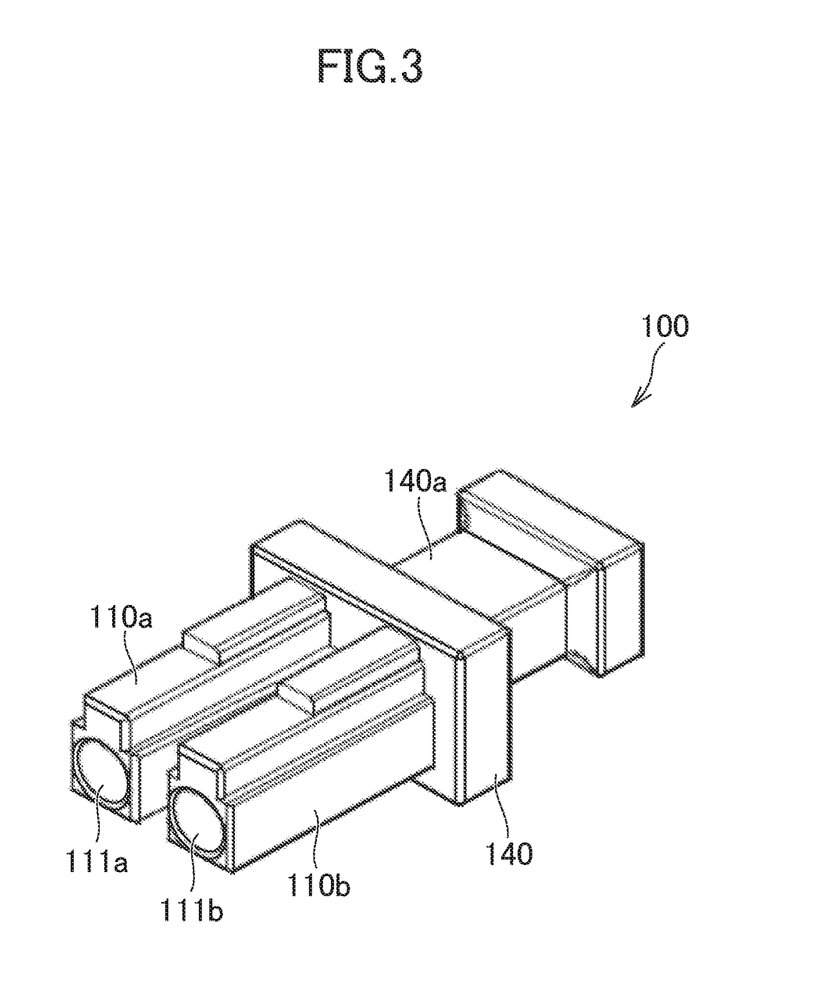
FIG. 3 shows a perspective view of a dust cap according to an embodiment of the invention.
Figure 4:
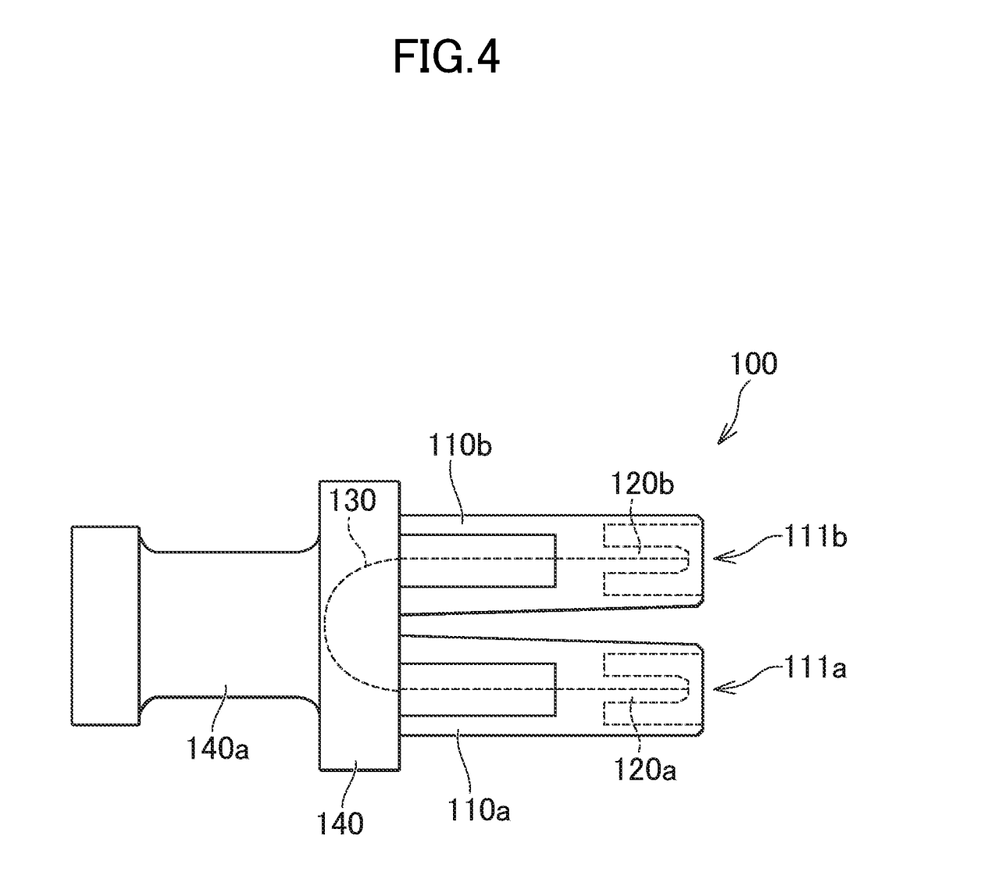
FIG. 4 shows a top view of a dust cap according to one embodiment of the invention.
Figure 5:
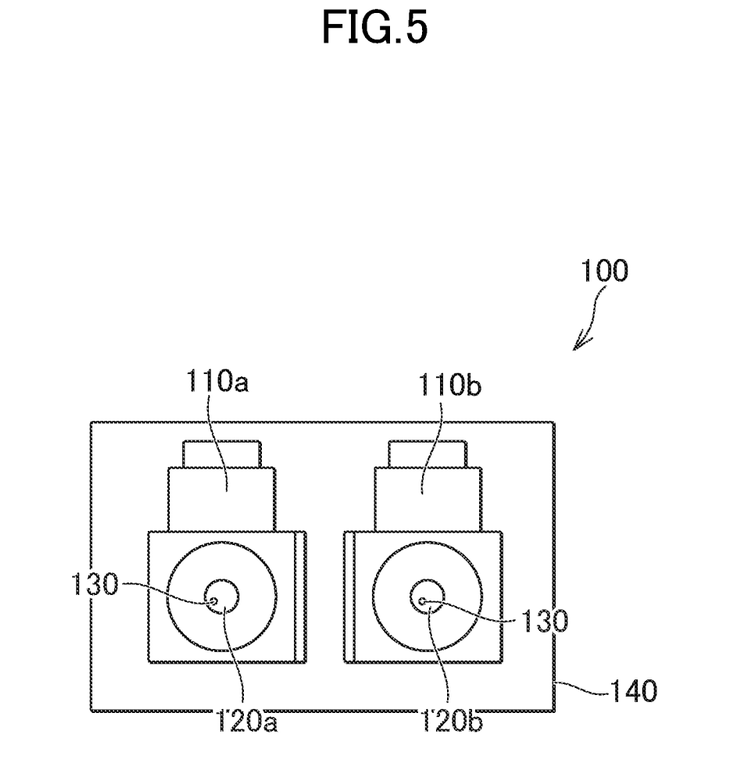
FIG. 5 shows a front view of a dust cap according to one embodiment of the invention.
Figure 6:
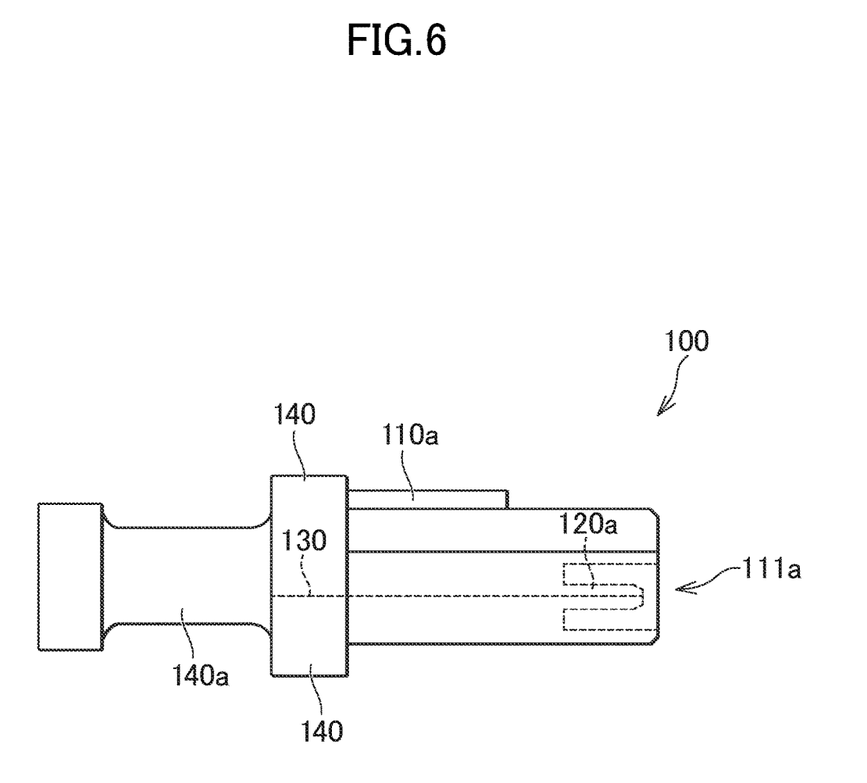
FIG. 6 shows a side view of a dust cap according to one embodiment of the invention.

FIG. 3 shows a perspective view of a dust cap 100. FIG. 4 shows a top view of a dust cap 100. FIG. 5 shows a front view of a dust cap 100. FIG. 6 shows a side view of a dust cap 100.

As shown in these figures, the dust cap 100 comprises two connectors 110a, 110b and a support member 140. The two connectors 110a, 110b and the support member 140 can be made from resin or rubber and formed as one body. The support member 140 comprises a planar part which covers both the transmission and reception adapters of the optical transceiver 300. One of the two connectors 110a, 110b is pressed into the transmission adapter of the optical transceiver 300, and the other of the two connectors 110a, 110b is pressed into the reception adapter of the optical transceiver 300. Thus, the outer shape of the connectors 110a, 110b extends in one direction like a connector of an optical fiber cable, and the cross sections of the connectors 110a, 110b are formed so as to adjust the inner shapes of the transmission and reception adapters, respectively. The connectors 110a, 110b stand on one surface of the planar part of the support member 140 side by side in the longitudinal direction, and a knob 140a is located on the other surface of the planar part of the support member 140. The knob 140a facilitates attaching the dust cap 100 to the optical transceiver 300 and removing the dust cap 100 from the optical transceiver 300. Hereinafter, the connector 110a is pressed into the transmission adapter and the connector 110b is pressed into the reception adapter.

The connectors 110a, 110b have openings 111a, 111b on the distal ends of the connectors 110a, 110b, respectively. Both ends of the optical transmission path 130 are located in the openings 111a, 111b, respectively. As shown in FIGS. 4 and 6, the optical transmission path 130 is built in the dust cap 100. Light enters the opening 111a of the connector 110a, passes through the optical transmission path 130, and exits from the opening 111b of the connector 110b. Specifically, the opening 111a of the connector 110a has a circular cross section, and the connector 110a has an internal space extending along the longitudinal direction in the connector 110a, shaped as cylindrical. A path-supporting member 120a with an elongate and cylindrical shape is located in this internal space, and extends along the longitudinal direction of the connector 110a. The path-supporting member 120a is integrated with the connector 110a. The path-supporting member 120a stands on the bottom surface of the cylindrical space of the connector 110a. The optical transmission path 130 is inserted through the path-supporting member 120a at the center of the cross section of the optical transmission path 130. One end of the optical transmission path 130 is exposed at the distal end of the path-supporting member 120a. For example, the optical transmission path 130 is an optical fiber made from glass or plastic.

Likewise, the opening 111b of the connector 110b has a circular cross section, and the connector 110b has an internal space extending along the longitudinal direction in the connector 110b, shaped as cylindrical. A path-supporting member 120b with an elongate and cylindrical shape is located in this internal space, and extends along the longitudinal direction of the connector 110b. The path-supporting member 120b is integrated with the connector 110b. The path-supporting member 120b stands on the bottom surface of the internal space of the connector 110b. The optical transmission path 130 is inserted through the path-supporting member 120b at the center of the cross section of the optical transmission path 130. The other end of the optical transmission path 130 is exposed at the distal end of the path-supporting member 120b.

The optical transmission path 130 locates at the center of the cross section of the optical transmission path 110a, extends along the longitudinal direction of the connector 110a, and penetrates the support member 140. The optical transmission path 130 bends toward the connector 110b in the support member 140, and penetrates the connector 110b, with the optical transmission path 130 locating at the center of the cross section of the connector 110b. The optical transmission path 130 locates at the center of the cross section of the optical transmission path 110b, and extends along the longitudinal direction of the connector 110b. The distal end of the optical transmission path 130 is exposed at the distal end of the path-supporting member 120b. In other words, the optical transmission path 130 is configured so as to pass through the center of the cross section of the path-supporting member 120a, the center of the cross section of the connector 110a, the support member 140, the center of the cross section of the connector 110a, and the center of the cross section of the path-supporting member 120b in that order.

The optical transmission path 130 may comprise an optical attenuator to attenuate the transmitted light. The optical transmission path 130 may itself also form an optical attenuator by controlling kinds and/or density of dopants and changing distribution of refractive index to make a material of the optical attenuator to attenuate an intended fraction of light. The optical transmission path 130 may also include a mirror coating on the whole inner surface to reflect light. In this case, the mirror may also function as an optical attenuator to a predetermined fraction of light by controlling distribution of refractive index of a multi-layered dielectric coating to arbitrarily select reflectivity of the multi-layered dielectric coating. The optical attenuator can set an arbitrary amount of attenuation for an individual dust cap 100, but cannot change an amount of attenuation for the optical attenuator.

The optical transceiver 300 has an operation test mode. In the operation test mode, a test light is emitted from the transmission adapter. Then the test light emitted from the transmission adapter enters one end of the optical transmission path 130 arranged in the opening 111a of the connector 110a. The light entering the end of the optical transmission path 130 is transmitted toward the connector 110b and exits from the other end of the optical transmission path 130 arranged in the opening 111b of the connector 110b. Then, the light exiting from the other end of the optical transmission path 130 enters the reception adapter. The optical transceiver 300 makes a decision about whether the intensity of the light entering the reception adapter satisfies a predetermined criteria, and then outputs the decision via a lamp, for example.

The dust cap 100 can be made from light-shielding material like black rubber to shield the laser light from the optical transceiver 300.

In accordance with the foregoing embodiments, the operation test for the optical transceiver 300 can be carried out without removing the dust cap 100 from the optical transceiver 300. Since the transmission and reception adapters of the optical transceiver 300 are sealed with the dust cap 100, the optical transceiver 300 is not determined as malfunctioning due to dust. The dust cap 100 eliminates any need to clean up the optical connectors, and the inside of the transmission and reception adapters, resulting in decrease in cost.

Figure 7:
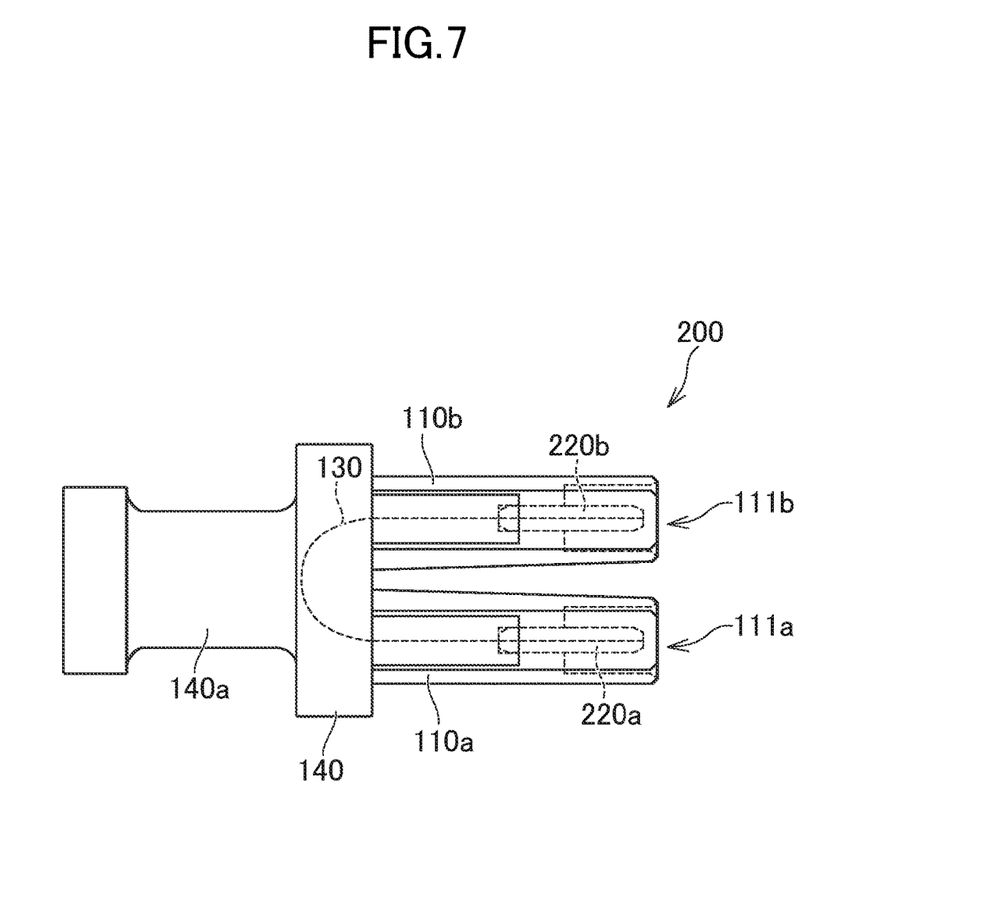
FIG. 7 shows a top view of a dust cap according to further embodiment of the invention.

It is noted that the invention is not limited to the foregoing embodiments, rather many variations are contemplated. FIG. 7 shows a top view of a dust cap 200 according to further embodiment of the invention. The dust cap 200 shown in FIG. 7 comprises ferrules 220a, 220b instead of the path-supporting members 120a, 120b. The ferrules 220a, 220b are made from zirconia or metal, and formed as a separate body from the connectors 110a, 110b and the support member 140. The ferrules 220a, 220b have an elongate cylindrical shape. The respective ends of the optical transmission path 130 are inserted into the ferrules 220a, 220b along the central axis of the optical transmission path 130, and exposed at the distal ends of the ferrules 220a, 220. The bottom surface of the internal space of the connector 110a has a hole at the center of the bottom surface. The hole has an approximately same diameter as that of the ferrule 220a. The proximal end of the ferrule 220a is fit into the hole. Likewise, the bottom surface of the internal space of the connector 110b has a hole at the center of the bottom surface. The hole has an approximately same diameter as that of the ferrule 220b. The proximal end of the ferrule 220b is fit into the hole. Transmission and reception ferrules are inserted into the transmission and reception adapters (not shown), respectively. When the dust cap 200 is attached to the optical transceiver 300, the ferrules 220a, 220b face the transmission and reception ferrules, respectively. The ferrules 220a, 220b preferably have the same shape as those of the transmission and reception ferrules fit into the transmission and reception adapters, respectively.

The respective ends of the ferrules 220a, 220b and the respective ends of the transmission and reception ferrules may be spaced apart from one another when the dust cap 200 is attached to the optical transceiver 300 in order to prevent the respective ends of the ferrules 220a, 220b and the respective ends of the transmission and reception ferrules from contacting each other, resulting in damage of the edge surfaces of these ferrules.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A dust cap for an optical transceiver comprising a transmission adapter and a reception adapter, comprising:
    a transmission connector made from one of resin and rubber and having an opening on a distal end of the transmission connector, which transmission connector is pressed into the transmission adapter;
    a transmission path supporting member with an elongate and cylindrical shape located in an internal space of the transmission connector, and integrated with the transmission connector;
    a reception connector made from one of resin and rubber and having an opening on a distal end of the reception connector, which reception connector is pressed into the reception adapter adjacent to the transmission adapter;
    a reception path supporting member with an elongate and cylindrical shape located in an internal space of the reception connector, and integrated with the reception connector;
    a support member connected with proximal ends of the transmission and reception connectors and configured to support the transmission and reception connectors; and
    an optical transmission path configured to pass through the transmission connector, the support member and the reception connector in that order and to transmit light from the opening of the transmission connector to the opening of the reception connector.

2. The dust cap according to claim 1, wherein the transmission and reception connectors and the support member are made from black rubber.

3. The dust cap according to claim 1, wherein the transmission connector comprises a transmission ferrule; and the reception connector comprises a reception ferrule.

4. The dust cap according to claim 3, wherein the transmission ferrule and the reception ferrule are arranged such that the respective distal ends of the transmission ferrule and the reception ferrule spaced apart from one another when the dust cap is attached to the optical transceiver.

5. An optical transceiver comprising a transmission adapter and a reception adapter adjacent to the transmission adapter, wherein a dust cap is attached to the transmission adapter and the reception adapter,
    the dust cap comprising:
        a transmission connector made from one of resin and rubber and having an opening on a distal end of the transmission connector, which transmission connector is pressed into the transmission adapter;
        a transmission path-supporting member with an elongate and cylindrical shape located in an internal space of the transmission connector, and integrated with the transmission connector;
        a reception connector made from one of resin and rubber and having an opening on a distal end of the reception connector adjacent to the transmission connector, which reception connector is pressed into the reception adapter;
        a reception path-supporting member with an elongate and cylindrical shape located in an internal space of the reception connector, and integrated with the reception connector;
        a support member connected with proximal ends of the transmission and reception connectors and configured to support the transmission and reception connectors; and
        an optical transmission path configured to pass through the transmission connector, the support member and the reception connector in that order and to transmit light from the opening of the transmission connector to the opening of the reception connector.

* * * * *